(12) United States Patent  (10) Patent No.: US 9,120,402 B2
Caruso et al.  (45) Date of Patent:  Sep. 1, 2015

(54) MOTOR VEHICLE CUP HOLDER

(71) Applicant: C.R.F. Societa' Consortile per Azioni, Orbassano (IT)

(72) Inventors: Alberto Caruso, Orbassano (IT); Franco Tosco, Orbassano (IT)

(73) Assignee: C.R.F. Società Consortile per Azioni, Orbassano (IT)

( * ) Notice: Subject to any disclaimer, the term of this patent is extended or adjusted under 35 U.S.C. 154(b) by 0 days.

(21) Appl. No.: 14/095,031

(22) Filed: Dec. 3, 2013

(65) Prior Publication Data

US 2014/0158848 A1  Jun. 12, 2014

(30) Foreign Application Priority Data

Dec. 3, 2012  (EP) ..................................... 12425193

(51) Int. Cl.
*B60N 3/10*  (2006.01)

(52) U.S. Cl.
CPC ............... *B60N 3/106* (2013.01); *B60N 3/105* (2013.01); *B60N 3/108* (2013.01); *B60N 3/103* (2013.01)

(58) Field of Classification Search
CPC ........ B60N 3/10; B60N 3/108; B60N 3/1065; B60N 3/103; B60N 3/105; B60N 3/106
USPC ......................... 248/309.1, 311.2, 314, 316.3; 220/495.03, 632, 694, 737; 224/926; 206/139, 562, 565; 280/33.992; 297/188.01, 188.14

See application file for complete search history.

(56) References Cited

U.S. PATENT DOCUMENTS

| 2,050,909 | A  | * | 8/1936  | Woodall ........................ 220/694 |
| 2,215,411 | A  | * | 9/1940  | Sebring ...................... 248/311.2 |
| 4,919,381 | A  | * | 4/1990  | Buist ............................. 248/154 |
| 5,860,559 | A  | * | 1/1999  | Wang ............................ 220/737 |
| 6,302,364 | B1 | * | 10/2001 | Chiueh ....................... 248/311.2 |
| 7,165,752 | B2 | * | 1/2007  | Dobos ........................ 248/311.2 |

FOREIGN PATENT DOCUMENTS

| DE | 10 2005 051 826 A1 | 5/2006 |
| DE | 20 2010 006 665 U1 | 9/2010 |
| EP |     2 392 490 A1    | 12/2011 |
| WO |   WO 2011/094728 A1 | 8/2011 |

* cited by examiner

*Primary Examiner* — Tan Le

(74) *Attorney, Agent, or Firm* — Dickstein Shapiro LLP

(57) ABSTRACT

A motor vehicle cup holder with a support made of a rigid material and having a receptacle, which extends along a vertical axis and is radially delimited by a side surface, having at least one retaining seat. The cup holder has a lining device, separate from the support and having a liner, which lines at least part of the side surface and defines a seat for housing a container. The lining device has an elastically deformable inner protuberance to grip the container and an outer protuberance to engage the retaining seat of the support and is elastically deformable to enable disengagement of this outer protuberance.

11 Claims, 5 Drawing Sheets

MOTOR VEHICLE CUP HOLDER

BACKGROUND OF THE INVENTION

1. Field of the Invention

The present invention relates to a motor vehicle cup holder.

2. Description of the Related Art

In motor vehicles, housings are normally provided on the tunnel console, between the front seats for example, to put down containers such as cups, holders, cans and bottles, and keep them upright. These housings are open at the top and have a side wall made of a plastic material, of shape and size such as to house the container with a small amount of clearance.

There is awareness of the need to be able to use the same housing for holding containers that have diameters and/or shapes slightly different from one another and to grip these containers in a stable manner, i.e. without play.

To meet this requirement, one or more side arms are normally provided and are pushed by springs to vary the diameter of the space available inside the housing, to adapt this space to the diameter and/or shape of the container that must be inserted.

These solutions are not very satisfactory, basically because they are constituted by a large number of parts and require relatively long assembly times in order to assemble the cup holder.

SUMMARY OF THE INVENTION

The object of the present invention is to make a motor vehicle cup holder, that enables resolving the above-mentioned drawbacks and can be easily adapted to containers having different shapes and/or sizes from one another.

According to the present invention, a motor vehicle cup holder is made, as described in more detail below.

BRIEF DESCRIPTION OF THE DRAWINGS

For a better understanding of the present invention, a preferred embodiment will now be described, purely by way of non-limitative example, with reference to attached drawings, where.

DETAILED DESCRIPTION OF THE INVENTION

Figure 1:
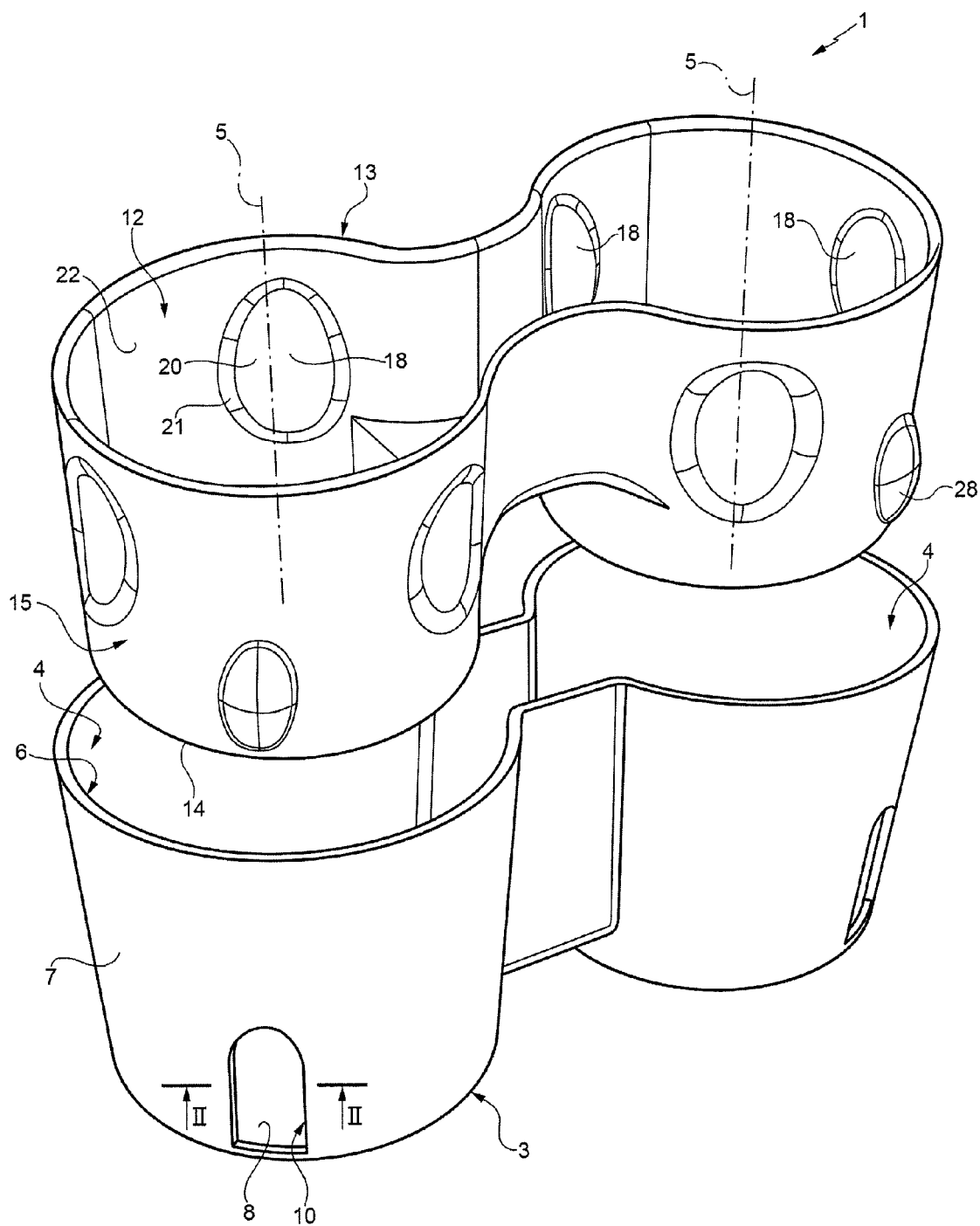
FIG. 1 shows, in a perspective and exploded view, a first preferred embodiment of the motor vehicle cup holder according to the present invention.

In FIG. 1, reference numeral 1 indicates a cup holder for the interior of a motor vehicle and in which a container, such as, for example, a cup, bottle, etc., can be placed in an upright and stable position.

The cup holder 1 comprises a support 3, which is made of a rigid material, for example a plastic material, and constitutes part of a console provided in the interior of the motor vehicle, for example between the front seats.

Alternatively, the support 3 is connected to this console in a fixed position.

The support 3 has at least one housing or receptacle 4, which extends along a vertical axis 5, is open at the top and is radially delimited by a side surface 6 having, for example, a substantially cylindrical or truncated-cone shape. In the example shown, the support 3 has two receptacles 4, the side surfaces 6 of which are joined together.

In particular, the support 3 comprises a side wall 7, which surrounds the axes 5 and has an inner surface that defines the side surfaces 6. The support 3 also comprises a base 8, which is joined to a bottom edge of the side wall 7 and defines the bottom of the receptacles 4.

Figure 2:
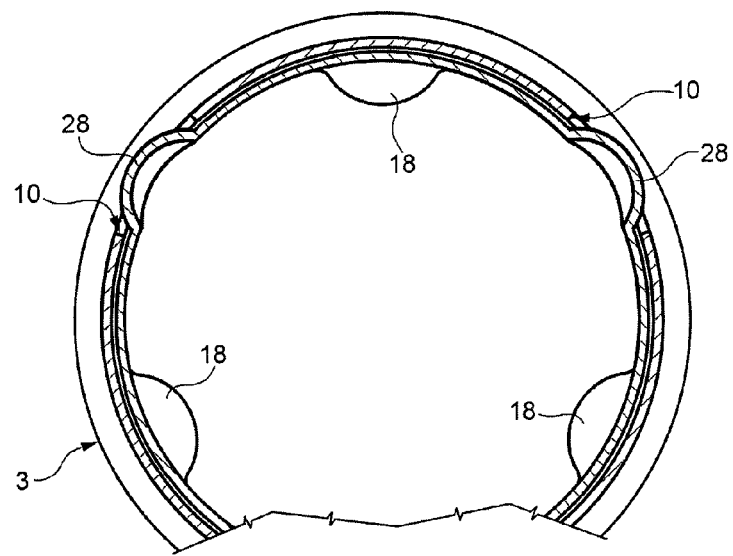
FIG. 2 is a cross-section of the cup holder in FIG. 1 along the section line II-II of FIG. 1, with parts removed for clarity.

According to one aspect of the present invention, for each receptacle 4, the support 3 has at least one retaining seat 10 formed on the side surface 6. In particular, the retaining seat 10 is defined by an opening that passes through the side wall 7. Preferably, a plurality of retaining seats 10 spaced out from each other around axis 5 is provided (FIG. 2).

The cup holder 1 also comprises a lining device 11, which is separate from the support 3 so that it can be inserted in the receptacle 4 and extracted in case of necessity. The device 11 lines at least part of the side surface 6 and defines a seat 12 to house at least one container. As will become evident from the following description, the device 11 performs the function of an adapter to house containers having a range of diameters and/or shapes smaller than the side wall 7, and the function of a retainer to keep the containers in a stable position in the seat 12.

The device 11 comprises a liner 13, which is made in one piece from a plastic material and has a cup-like shape similar to that of the support 3.

The top edge of the liner 13 defines an access opening for the seat 12. The liner 13, in turn, comprises a base 14, on which the container will rest, and a side wall 15, which is elastically deformable, at least in certain zones, and extends uninterruptedly around axis 5 so as to cover the entire perimeter of the side surface 6.

According to variants that are not shown, the liner 13 is defined by a sleeve, i.e. by just the side wall 15 and without the base 14, preferably with stiffening along the bottom annular edge of the side wall 15. In this case, the container can be stood on the bottom of the receptacle 4, i.e. on the base 8.

In the embodiment in FIGS. 1 and 2, the device 11 is defined solely by the liner 13. The side wall 15 comprises one or more protuberances 18, which are radially inwardly facing and elastically deformable in the outward direction, i.e. towards the side surface 6, when the seat 12 receives a container having a diameter greater than that available between the protuberances 18. In this way, the protuberances 18 exert a radial press fit against the side surface of the container so as to grip the latter in a fixed position.

Preferably, the protuberances 18 are defined by embossments, domes or bends, which have a raked upper surface to define an insertion guide for easily inserting the container into the seat 12. In particular, for each receptacle 4, the embossments are set apart from each other around axis 5 and comprise respective top portions 20, which make contact against the side surface of the container, and respective peripheral portions 21, which join the top portions 20 to a remaining part 22 of the side wall 15. According to a preferred variant that is not shown, the thickness of the side wall 15 is greatest at the top portions 20 and progressively diminishes along the peripheral portions 21 to reach a relatively small, constant thickness on part 22.

If sectioned along any cross-section plane orthogonal to axis 5, the sections of the side surface 6 and part 22 have substantially the same shape. As can be seen in FIG. 2, the two sections have the same dimensions, and so part 22 rests against the side surface 6. On the contrary, the top portions 20 remain set apart from the side surface 6, i.e. an air cushion is provided behind each embossment.

The side wall 15 also comprises one or more protuberances 28, which are radially outwardly facing, each one engaging an associated retaining seat 10 in order to axially grip the device 11 in the support 3. Part 22 and/or the protuberances 28 are elastically deformable to give the protuberances 28 the possibility of withdrawing towards to inside. In this way, it is possible to disengage the protuberances 28 from the retaining seats 10 when the device 11 is lifted and removed from the support 3, and easily slide the protuberances 28 along the side surface 6 before making them snap into the retaining seats 10 when the device 11 is inserted into the support 3.

Obviously, the protuberances 28 are spaced apart from each other by the same distance as that between the retaining seats 10. Preferably, the protuberances 28 are arranged at a lower height than the protuberances 18. Advantageously, the protuberances 28 are also defined by embossments, domes or bends, which have an upper surface and a lower surface raked so as to define guides that facilitate disengagement from the retaining seats 10 and insertion into the support 3.

Protuberances 28 can have the same thickness as part 22, as is actually shown in FIG. 2, or have a greater thickness.

Preferably, the base 14 and the side wall 15 do not have any holes: in this way, the liner 13 collects any spilt liquids and can easily be cleaned after being extracted from the receptacle 4.

Figure 3C:
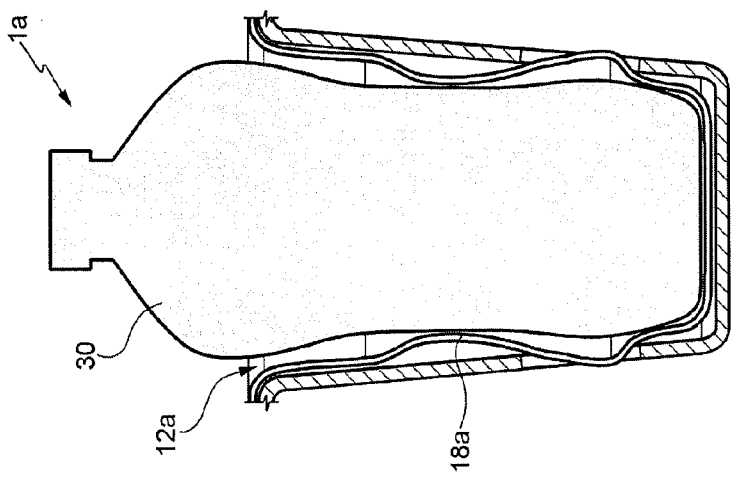
FIGS. 3a to 3c schematically show sectional views of a second preferred embodiment of the motor vehicle cup holder according to the present invention, in three different operating conditions.
Figure 3B:
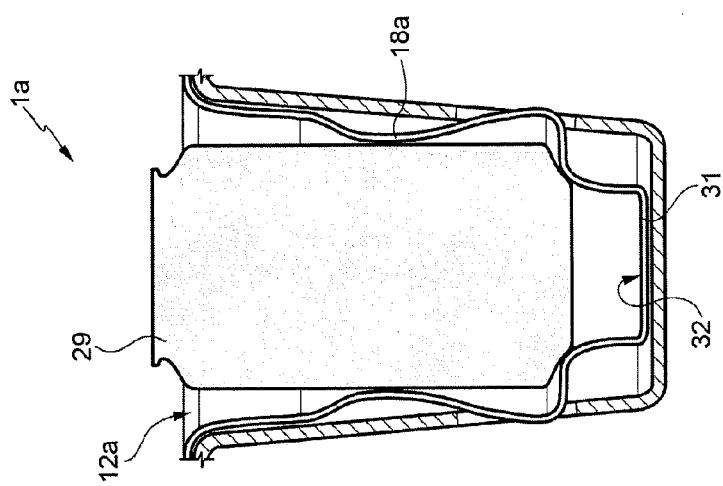
Figure 3A:
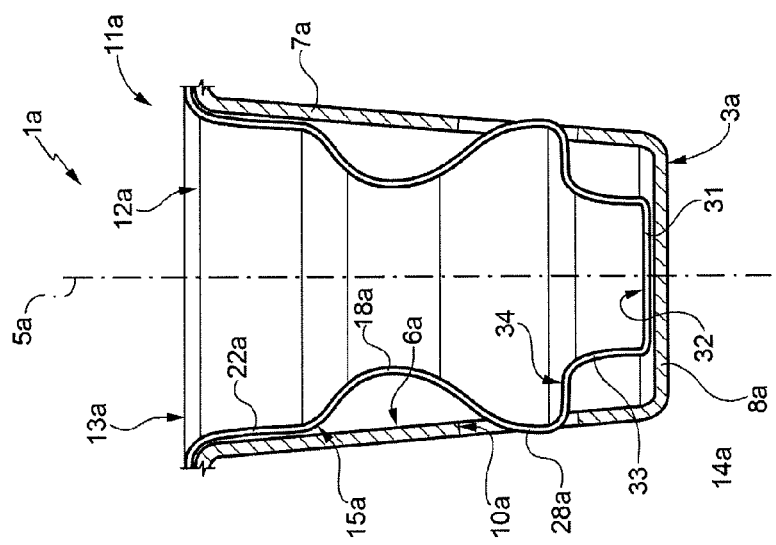

FIG. 3a-3c regard a cup holder 1a, the constituent parts of which are indicated, where possible, by the same reference numerals of FIGS. 1 and 2, followed by the reference letter "a". The base 14a can be adapted so that the seat 12 accepts a shorter container 29 or a taller container 30. In particular, container 29 is defined by a can and container 30 is defined by a bottle. The base 14a comprises a central portion 31, defining a substantially horizontal plane 32, and a peripheral portion 33, which is arranged around the central portion 31 and has an upper surface 34, this also being substantially horizontal and arranged at a height above the plane 32.

The peripheral portion 33 is elastically deformable so that it can become flattened and widen the plane 32 if subjected to pressure from above. The rigidity of the peripheral portion 33 (together with the friction and the compression exerted by the protuberances 18a on the side surface of container 29) is sufficient to support the weight of the container 29 without deformation in the downward direction. Thus, surface 34 defines a support for container 29, which remain raised with respect to plane 32.

Instead, by pressing down on the peripheral portion 33 via container 30, the latter will descend, making the peripheral portion 33 deform elastically. In consequence, although being taller, container 30 protrudes a relatively small amount from the seat 12a and the receptacle 4a, which does not cause obstruction in the interior of the motor vehicle, yet still allows the container 30 to be easily grasped to extract it. Preferably, the peripheral portion 33 and consequently surface are annular. Alternatively, they could be defined by a plurality of segments.

Figures 4A, 4B:
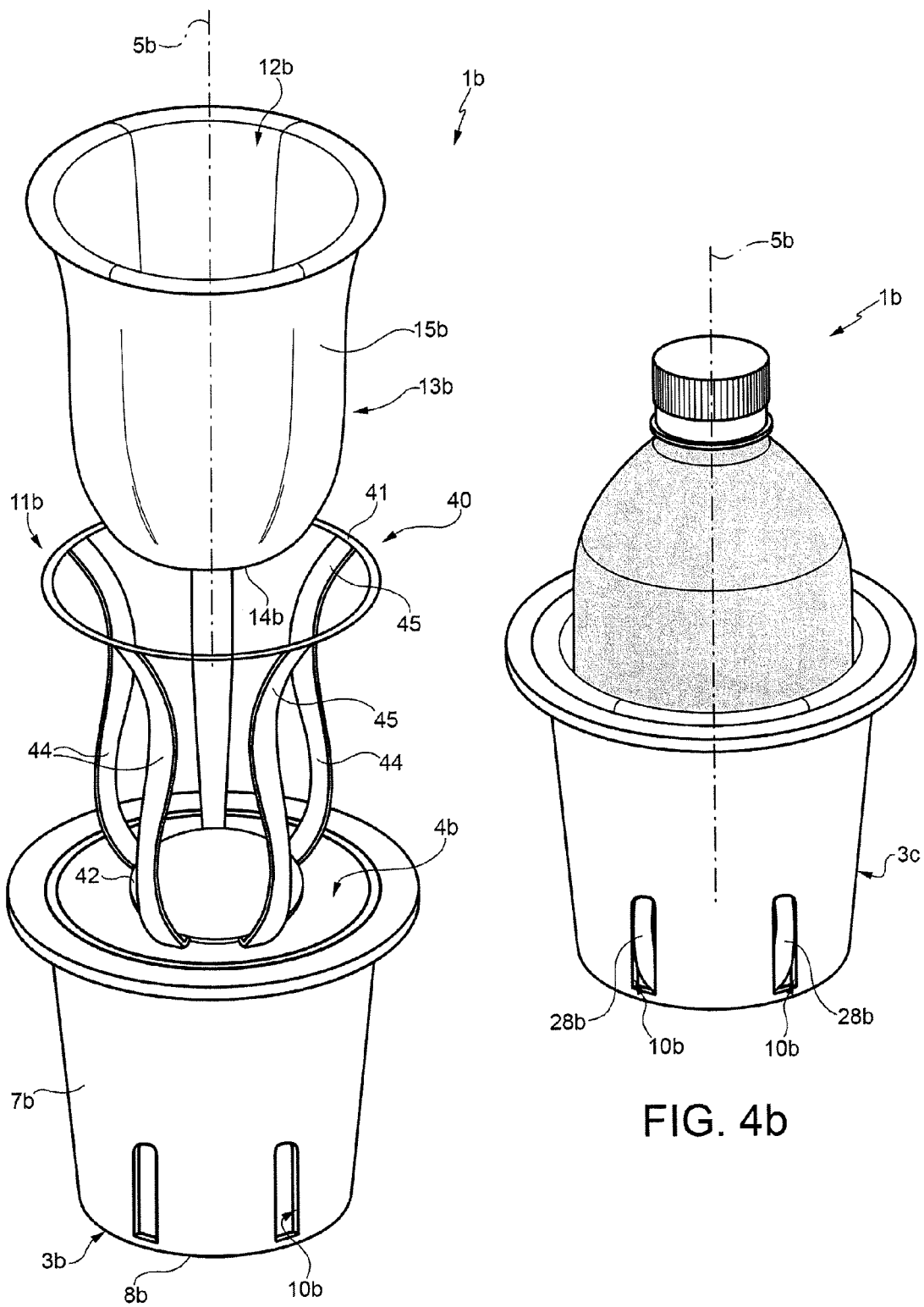
FIG. 4a is similar to FIG. 1 and shows a third preferred embodiment of the motor vehicle cup holder, according to the present invention.
FIG. 4b shows the cup holder of FIG. 4a, with the components assembled one inside the other.

The parts that constitute the cup holder 1b in FIGS. 4a and 4b are indicated, where possible, by the same reference numerals of the previous figures, followed by the reference letter "b". In this case, the device 11b is constituted by the liner 13b and a frame 40. The side wall 15b of the liner 13b is flexible, has a rectilinear or slightly curved generatrix when not deformed, so as not to have any radial protuberance, and a substantially constant thickness. The frame 40 is arranged between the liner 13b and the support 3b, is also elastically deformable, but is more rigid than the side wall 15b. The frame 40 is shaped with radial protuberances that radially deform the side wall 15b towards the inside and so form the inwardly facing protuberances that grip the container.

At the same time, the frame 40 is shaped so as to have protuberances 28b, which engage the retaining seats 10b.

In the particular example shown, the frame 40 comprises: a top ring 41 arranged around a top portion of the side wall 15b; a base 42 defined by a circular plate arranged beneath the base 14b; and a plurality of strips 44, which are set apart from each other around axis 5b, join the top ring 41 to the edge of the base 42 and are elastically deformable in the radial direction. The strips 44 have a double-bend shape, i.e. each one comprising an upper bend 45, which presses against the side wall 15b to form an associated protuberance towards the inside (not visible in FIG. 4b) and a lower bend, which defines an associated protuberance 28b.

According to variants that are not show, the base 42 is defined by a ring, arranged, for example, around a lower portion of the side wall 14b.

Figure 6:
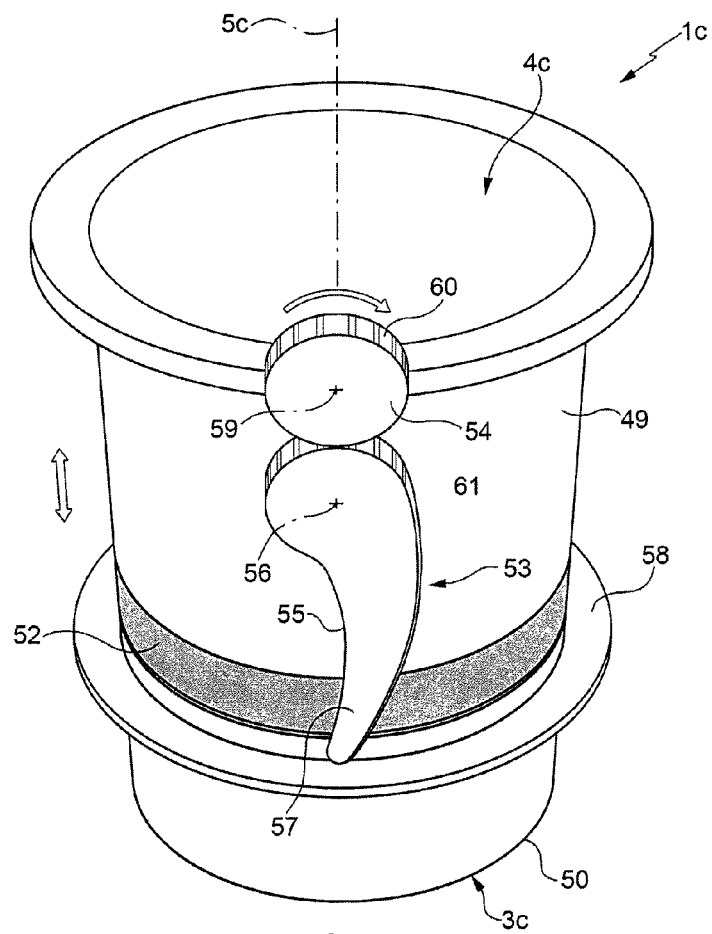
FIG. 6 is a perspective view of the cup holder in FIGS. 5a-5b.
Figure 5B:
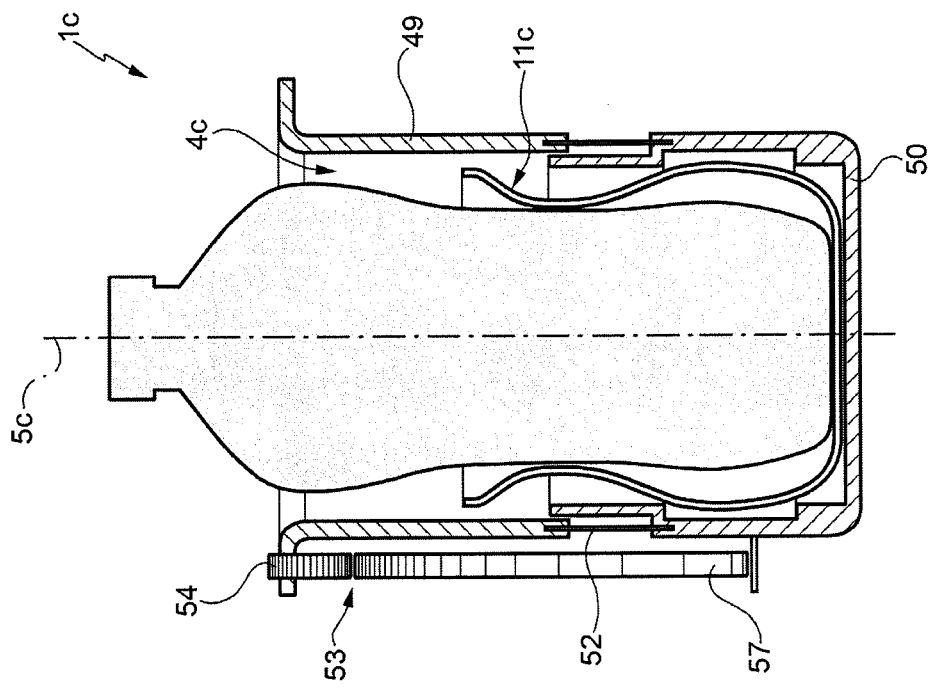
FIGS. 5a and 5b are similar to FIGS. 3a-3c and show a fourth preferred embodiment of the motor vehicle cup holder according to the present invention.
Figure 5A:
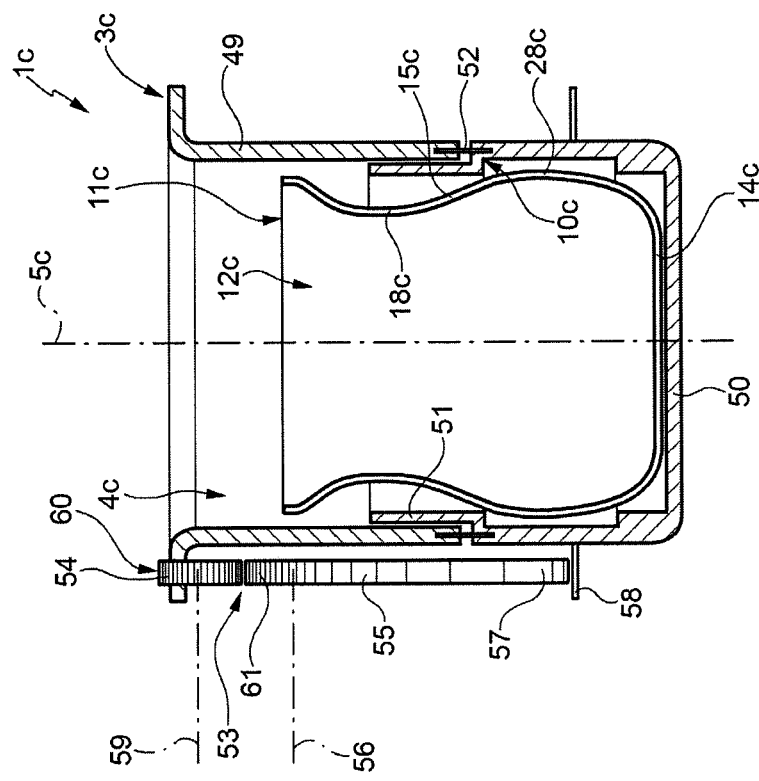

The parts that constitute the cup holder 1c in FIGS. 5a, 5b and 6 are indicated, where possible, by the same reference numerals of the previous figures, followed by the reference letter "c".

In this case, the support 3c comprises a lower body 50 and an upper body 49, coaxial and axially movable with respect to each other between a first and a second configuration, to which a minimum and a maximum depth of the receptacle 4c respectively correspond. In the present case, body 49 is fixed, while body 50 is movable and is provided with retaining seats 10c to grip the device 11c.

The cup holder 1c comprises an axial guide 51 that keeps the two bodies 50,49 coaxial. Preferably, the axial guide 51 is shaped to prevent relative rotation of the bodies 50,49 around axis 5c.

The cup holder 1c also comprises at least one elastic element 52, which exerts an elastic action so as to move the bodies 50,49 towards one of the above-stated configurations, and a cam and follower device 53 that can be operated manually, i.e. without electrical actuation, by means of a member 54, for bringing the bodies 50,49 into the other configuration against the action of element 52.

This embodiment has substantially the same technical effect of the embodiment in FIG. 3, i.e. the capacity to adjust the height of the part of the container that protrudes upwards with respect to the receptacle 4c.

In particular, the device 53 comprises a cam 55, which is positioned on the outside of the receptacle 4c, is hinged to the body 49 around a substantially radial axis of rotation 56 and comprises a lobe 57 resting against a cam follower 58, which is fixed with respect to the body 50. Preferably, the cam follower 58 is defined by a tongue that protrudes horizontally from an external side surface of the body 50. In particular, the member 54 is defined by a roller or knob, which is carried by the body 49 on the outside of the receptacle 4c, protrudes upwards with respect to a top edge of the receptacle 4c and can rotate around its own axis 59. The axes 58 and 56 are parallel, and the knob 54 has an outer side surface 60 that is toothed or knurled and engages with a corresponding toothed or knurled portion 61 of the cam 55.

In the particular example shown, the elastic element 52 is defined by a sleeve coaxial with the bodies 50,49 and having a top edge fixed to body 49 and a bottom edge fixed to body 50.

From that described above, it is evident that the device 11,11a,11b,11c enables adapting the cup holder 1,1a,1b,1c to containers of different shape and/or diameter, at least within certain limits, and gripping the container in a stable manner, without having to provide moving mechanical parts, hinges or springs, which would instead require relatively longer times and higher costs for manufacture and assembly. In fact, the liner 13,13a,13b,13c is made in a relatively simple manner, by moulding for example, and simply needs to be inserted into the support 4.

At the same time, protuberances or appendages 18,18a,45, 18c enable using the cup holder with different containers, while protuberances or appendages 28,28a,28b,28c secure the liner in the support 3,3a,3b,3c. The gripping force exerted by the engagement of protuberances 28,28a,28b,28c in retaining seats 10,10a,10b,10c must be calibrated, with appropriate contrivances, so as to be greater than the gripping force of the container in seat 12,12a,12b,12c, to avoid the device 11,11a,11b,11c being involuntarily extracted from seat 12,12a,12b,12c together with the container when the latter is lifted out and removed from the cup holder 1,1a,1b, 1c.

Thanks to the special characteristics described above, it is possible to produce a relatively inexpensive, yet functional solution, limiting the number of additional components to the utmost.

The constructional modifications to be made to the consoles of motor vehicles are very small, as they basically consist in making slightly wider receptacles 4,4a,4b,4c and in making the retaining seats 10,10a,10b,10c.

Other advantages have also been explained in the foregoing, in particular with regard to cup holders 1a and 1c.

Finally, it is clear that various modifications and changes can be made to the cup holders 1,1a,1b,1c described and illustrated herein without leaving the scope of protection of the present invention, as defined in the appended Claims.

In particular, seats 12,12a,12b,12c and/or the receptacles 4,4a,4b,4c could have different shapes and/or dimensions from those shown here by way of example.

What is claimed is:

1. A motor vehicle cup holder comprising a support made of a rigid material and having a receptacle, which extends along a vertical axis and is radially delimited by a side surface of said support; said side surface having at least one retaining seat; said cup holder further comprising a lining device defined solely by a liner which is separate from said support for being inserted/extracted with respect to said receptacle; said liner comprising a side wall, which lines at least part of said side surface and defines a seat for housing a container; said side wall comprising:
    a) at least a first protuberance, projecting radially inwards and elastically deformable to grip said container;
    b) at least a second protuberance, projecting radially outwards and engaging said retaining seat for axially holding said side wall in said receptacle; and
    c) at least one elastically deformable zone to allow said second protuberance to withdraw towards the inside and be released from said retaining seat;
    wherein said second protuberance is arranged at a lower height than the said first protuberance, with respect to said vertical axis.

2. The cup holder according to claim 1, wherein said side wall is elastically deformable and extends uninterruptedly around said vertical axis so as to cover said side surface for the entire extension of said side surface.

3. The cup holder according to claim 2, wherein said liner has no holes and further comprises a base so as to have a cup-like shape.

4. The cup holder according to claim 2, wherein said liner comprises a base having:
    a central portion defining a support plane, and
    a peripheral portion, which is arranged around said central portion, defining a support surface at a height above said support plane and elastically deformable in the downward direction so as to become flattened.

5. The cup holder according to claim 1, wherein said first protuberance has a greater thickness with respect to a remaining part of said side wall.

6. The cup holder according to claim 2, wherein said lining device is defined by said liner and by a frame, which is arranged between said liner and said support, is elastically deformable, is more rigid than said side wall and is forced against said side wall so as to form said first protuberance; said second protuberance being defined by a portion of said frame.

7. The cup holder according to claim 6, wherein said frame comprises a top ring arranged around said side wall and a plurality of strips that are elastically deformable and extend downwards from said top ring; said second protuberance being defined by a lower bend of at least one of said strips.

8. The cup holder according to claim 1, wherein said support comprises a lower body and an upper body, coaxial and axially moveable with respect to each other between a first and a second configuration, to which a minimum and a maximum depth of said receptacle respectively correspond; and further comprising:
    elastic means exerting an elastic action so as to bring said lower and upper bodies into one of said configurations;
    cam means to bring said lower and upper bodies into the other of said configurations against the action of said elastic means, and
    a manually operable control member to control said cam means.

9. The cup holder according to claim 8, wherein said cam means comprise a cam hinged to said upper body.

10. The cup holder according to claim 8, wherein said control member is carried by said upper body.

11. The cup holder according to claim 8, wherein said elastic means comprise an elastic sleeve coaxial with said lower and upper bodies, interposed between said lower and upper bodies and having a top edge fastened to said upper body and a bottom edge fastened to said lower body.

* * * * *